United States Patent [19]

Kasahara et al.

[11] Patent Number: 5,762,892
[45] Date of Patent: Jun. 9, 1998

[54] PROCESS FOR PURIFYING EXHAUST GASES

[75] Inventors: Koichi Kasahara; Syuji Tateishi, both of Shizuoka-ken; Naoto Miyoshi, Nagoya; Shinichi Matsumoto, Aichi-ken, all of Japan

[73] Assignees: Cataler Industrial Co., Ltd., Shizuoka; Toyota Jidosha Kabushiki Kaisha, Toyota, both of Japan

[21] Appl. No.: 864,894

[22] Filed: May 29, 1997

Related U.S. Application Data

[63] Continuation of Ser. No. 501,258, Jul. 11, 1995, abandoned.

[30] Foreign Application Priority Data

Jul. 12, 1994 [JP] Japan ..................... 6-160209

[51] Int. Cl.⁶ ............................ B01D 53/94
[52] U.S. Cl. ............................ 423/213.5
[58] Field of Search ...................... 423/213.5

[56] References Cited

U.S. PATENT DOCUMENTS

| | | | |
|---|---|---|---|
| 4,806,519 | 2/1989 | Chiba et al. | 423/213.5 |
| 4,965,243 | 10/1990 | Yamada | 423/213.5 |
| 5,063,192 | 11/1991 | Murakami et al. | 423/213.5 |
| 5,116,800 | 5/1992 | Williamson et al. | 423/213.5 |
| 5,179,059 | 1/1993 | Domesle | 423/213.5 |
| 5,402,641 | 4/1995 | Katoh et al. | 60/285 |
| 5,496,788 | 3/1996 | Domesle et al. | 423/213.5 |

FOREIGN PATENT DOCUMENTS

| | | |
|---|---|---|
| 507 590 | 10/1992 | European Pat. Off. . |
| 558 159 | 9/1993 | European Pat. Off. . |
| 562 516 | 9/1993 | European Pat. Off. . |
| 573 672 | 12/1993 | European Pat. Off. . |
| 658 370 | 6/1995 | European Pat. Off. . |
| 2189112 | 1/1974 | France . |
| 63-270544 | 11/1988 | Japan . |
| 64-58347 | 3/1989 | Japan . |
| 5-168860 | 7/1993 | Japan . |
| 5-317652 | 12/1993 | Japan . |
| 6-31139 | 2/1994 | Japan . |

*Primary Examiner*—Steven Bos
*Assistant Examiner*—Peter DiMauro
*Attorney, Agent, or Firm*—Oliff & Berridge, PLC

[57] ABSTRACT

A catalyst for purifying carbon monoxide, hydrocarbons and nitrogen oxides in exhaust gases at the stoichiometric point or in oxygen-rich atmosphere, is disclosed, and it includes a porous support, at least one noble metal catalyst ingredient loaded on the porous support, and selected from the group consisting of platinum, palladium and rhodium, and at least one $NO_x$ adsorbent loaded on the porous support, selected from the group consisting of alkali metals, alkaline-earth metals and rare-earth elements, and having an average particle diameter falling in a range of from 0.1 to 20 micrometers. A process for purifying, by bringing the exhaust gases into contact with the catalyst, is also disclosed.

12 Claims, No Drawings

PROCESS FOR PURIFYING EXHAUST GASES

This is a Continuation of application Ser. No. 08/501,258 filed Jul. 11, 1995 now abandoned.

BACKGROUND OF THE INVENTION

1. Field of the Invention

The present invention relates to a catalyst for purifying exhaust gases and a process for purifying exhaust gases. More particularly, it relates to the catalyst and the process which can efficiently purify nitrogen oxides ($NO_x$) included in the exhaust gases whose oxygen concentrations are at the stoichiometric point or more than required for oxidizing harmful components, such as carbon monoxide (CO) and hydrocarbons (HC), included therein.

2. Description of Related Art

As catalysts for purifying automotive exhaust gases, there have been employed 3-way catalysts so far which oxidize CO and HC and simultaneously reduce $NO_x$ to purify the exhaust gases. For example, the 3-way catalysts have been known widely which comprise a heat resistant support formed of cordierite, a catalyst carrier layer formed of gamma-alumina and disposed on the support, and a noble metal catalyst ingredient selected from the group consisting of platinum, palladium and rhodium and loaded on the catalyst carrier layer.

Japanese Unexamined Patent Publication (KOKAI) No. 63-270,544 discloses a novel exhaust-gas-purifying catalyst whose heat resistance is improved. This novel catalyst comprises a catalyst carrier layer which includes active alumina with a platinum-group element loaded, cerium oxide, barium nitrate, and barium formate. Japanese Unexamined Patent Publication (KOKAI) No. 64-58,347 discloses another novel exhaust-gas-purifying catalyst whose heat resistance is improved. This novel catalyst comprises a catalyst carrier layer which includes active alumina with a platinum-group element loaded, cerium oxide, a barium compound, and a zirconium compound.

The purifying performance of these exhaust-gas-purifying catalysts depends greatly on the air-fuel ratio (A/F) of an automotive engine. For instance, when the air-fuel weight ratio is larger than 14.6, i.e., when the fuel concentration is low (or on the fuel-lean side), the oxygen concentration is high in exhaust gases. Accordingly, the oxidation reactions purifying CO and HC are active, but the reduction reactions purifying $NO_x$ are inactive. On the other hand, when the air-fuel ratio is smaller than 14.6, i.e., when the fuel concentration is higher (or on the fuel-rich side), the oxygen concentration is low in exhaust gases. Accordingly, the oxidation reactions are inactive, but the reduction reactions are active.

Moreover, when driving automobiles, especially when driving automobiles in urban areas, the automobiles are accelerated and decelerated frequently. Consequently, the air-fuel ratio varies frequently in the range of from the values adjacent to the stoichiometric point (or the theoretical air-fuel ratio: 14.6) to the fuel-rich side (i.e., in oxygen-lean atmosphere). In order to satisfy the low fuel consumption requirement during the driving conditions such as in the above-described urban areas, it is necessary to operate the automobiles on the fuel-lean side where the air-fuel mixture containing oxygen as excessive as possible is supplied to the engines. Hence, it has been desired to develop a catalyst which is capable of adequately purifying $NO_x$ even on the fuel-lean side (i.e., in oxygen-rich atmosphere).

Such exhaust-gas-purifying catalysts have been proposed so far in prior Japanese Patent applications. For example, Japanese Unexamined Patent Publication (KOKAI) No. 5-317,652 discloses an exhaust-gas-purifying catalyst on which barium (Ba), representing alkaline-earth metals, and platinum are loaded. Japanese Unexamined Patent Publication (KOKAI) No. 5-168,860 discloses an exhaust-gas-purifying catalyst on which lanthanum (La), representing rare-earth elements, and platinum are loaded. Japanese Unexamined Patent Publication (KOKAI) No. 6-31,139 discloses an exhaust-gas-purifying catalyst on which potassium (K) and platinum are loaded. In these catalysts, during the fuel-lean side (i.e., in oxygen-rich atmosphere) driving, $NO_x$ is adsorbed on the alkaline-earth metal, and the like. During the stoichiometric-point driving or the fuel-rich side (i.e., in oxygen-lean atmosphere) driving, the adsorbed $NO_x$ reacts with the reducing gas such as HC, CO etc. to be purified. As a result, these catalysts exhibit superb $NO_x$ purifying performance during the fuel-lean side (i.e., in oxygen-rich atmosphere) driving.

The catalyst, for instance, proposed in Japanese Unexamined Patent Publication (KOKAI) No. 5-317,652, is believed to provide the advantageous effect as follows: namely; the barium is loaded as simple oxide on the support, and it reacts with $NO_x$ to produce barium nitrates, e.g., $Ba(NO_3)_2$. Thus, $NO_x$ is adsorbed as the barium nitrates on the support of the catalyst.

However, the exhaust gases usually contain sulfur dioxide ($SO_2$) gas which is produced by burning sulfur (S) contained in the fuel. Further, the catalyst ingredient oxidizes $SO_2$ to sulfur trioxide ($SO_3$) in oxygen-rich atmosphere (i.e., on the fuel-lean side). Still further, $SO_3$ reacts readily with water vapor also contained in the exhaust gases to produce sulfuric acid. It has been revealed that the resulting sulfuric acid reacts with the barium loaded on the support to produce barium sulfites and barium sulfates which do not have $NO_x$ adsorbing capability. As a result, the catalyst proposed in Japanese Unexamined Patent Publication (KOKAI) No. 5-317,652 suffers from a drawback in that it might not exhibit the $NO_x$ purifying performance satisfactorily after it is subjected to a high-temperature durability test.

SUMMARY OF THE INVENTION

The present invention has been developed in view of the aforementioned circumstances. It is an object of the present invention to provide an exhaust-gas-purifying catalyst whose $NO_x$ purifying performance is improved even after it is subjected to a high-temperature durability test. It is another object of the present invention to provide an exhaust-gas-purifying process which utilizes the catalyst.

In accordance with the present invention, a catalyst is provided which can solve the aforementioned problems. The present catalyst is for purifying carbon monoxide, hydrocarbons and nitrogen oxides in exhaust gases at the stoichiometric point or in oxygen-rich atmosphere whose oxygen concentration is more than required for oxidizing the components to be oxidized therein, thereby purifying the exhaust gases, and it comprises:

a porous support;

at least one noble metal catalyst ingredient loaded on the porous support, and selected from the group consisting of platinum, palladium and rhodium; and at least one $NO_x$ adsorbent loaded on the porous support, selected from the group consisting of alkali metals, alkaline-earth metals and rare-earth elements, and having an average particle diameter falling in a range of from 0.1 to 20 micrometers.

In accordance with the present invention, a process is provided for purifying carbon monoxide, hydrocarbons and nitrogen oxides at the stoichiometric point or in exhaust gases in oxygen-rich atmosphere, thereby purifying the exhaust gases, the process comprising the step of:

bringing exhaust gases at the stoichiometric point or in oxygen-rich atmosphere, whose oxygen concentration is more than required for oxidizing the components to be oxidized therein, into contact with a catalyst:

the catalyst, comprising:

a porous support;

at least one noble metal catalyst ingredient loaded on the porous support, and selected from the group consisting of platinum, palladium and rhodium; and at least one $NO_x$ adsorbent loaded on the porous support, selected from the group consisting of alkali metals, alkaline-earth metals and rare-earth elements, and having an average particle diameter falling in a range of from 0.1 to 20 micrometers.

In the present invention, an exhaust-gas-purifying catalyst comprises at least one $NO_X$ adsorbent which is loaded on an porous support, which is selected from the group consisting of alkali metals, alkaline-earth metals and rare-earth elements, and which has an average particle diameter falling in a range of from 0.1 to 20 micrometers.

In the aforementioned conventional catalysts, when loading an alkaline-earth metal compound (e.g., a barium compound) working as an $NO_x$ adsorbent on a porous support, the barium compound is dissolved into water to prepare an aqueous solution in order that the porous support can absorb the aqueous solution. Consequently, the barium compound is loaded on the porous support in the form of ions or dispersed molecules. The present inventors found that, when an $NO_x$ adsorbent is loaded on an alumina support in extremely micro-fine forms, such as molecular states, or the like, the $NO_x$ adsorbing capability of the alumina support is deteriorated so that the $NO_x$ purifying capability of the resulting catalyst is degraded.

On the other hand, in the present invention, the $NO_x$ adsorbent loaded on the porous support is formed as a powder which has an average particle diameter of from 0.1 to 20 micrometers. Thus, the present invention distinguishes over the aforementioned case where the $NO_x$ adsorbent is loaded in the form of ionic states, or the like, and the $NO_x$ purifying capability of the resulting catalyst is little decreased. It is still under investigation what causes this advantageous effect. It is assumed, however, that sulfur trioxide ($SO_3$) produced in oxygen-rich (i.e., fuel-lean) atmosphere is inhibited from reacting with the $NO_x$ adsorbent (e.g., a barium compound) to produce barium sulfate, and consequently the $NO_x$ adsorbing capability of the barium compound is kept from deteriorating. In other words, it is believed that, in the present invention, the $NO_x$ adsorbent takes forms which are less likely to be susceptible to neutralization reactions resulting from sulfate ions, but which are more likely to adsorb $NO_x$ thereon. All in all, in accordance with the present invention, the resulting exhaust-gas-purifying catalyst can maintain its $NO_x$ adsorbing capability, and thereby it can purify $NO_x$ for a longer period of time than conventional exhaust-gas-purifying catalyst. Thus, the resulting exhaust-gas-purifying catalyst is improved in terms of high-temperature durability even in stoichiometric atmosphere, or in oxygen-rich (i. e., fuel-lean) atmosphere.

In the present invention, since the $NO_x$ adsorbent is loaded in a powder form which keeps its specific average particle diameter, it is possible to utilize an $NO_x$ adsorbent which is insoluble or unlikely to dissolve into a loading medium. As a result, it is possible to utilize a weak acid salt of an $NO_x$ adsorbent which can be loaded on a porous support while keeping its specific average particle diameter and which can be loaded thereon together with the other components. For instance, when water is utilized as a slurry medium (i.e., loading medium), it is possible to employ a powder having a specific average particle diameter and formed of barium carbonate, barium oxalate, or barium oleate, which is insoluble or unlikely to dissolve into water, as the $NO_x$ adsorbent. When an organic solvent, such as alcohol, is utilized as a slurry medium, it is possible to load a powder having a specific average particle diameter and formed of barium acetate, barium formate, barium citrate, barium oxide, barium nitrite, barium nitrate, barium hydroxide, or barium tartrate, which is insoluble or unlikely to dissolve into alcohol, on a porous support as the $NO_x$ adsorbent.

The average particle diameter of the $NO_x$ adsorbent preferably falls in a range of from 0.1 to 20 micrometers, further preferably from 0.5 to 10 micrometers. When the average particle diameter is less than 0.1 micrometer, the $NO_x$ adsorbent is likely to produce sulfate compounds and sulfite compounds so that its $NO_x$ adsorbing capability deteriorates, and thereby the $NO_x$ purifying capability of the resulting exhaust-gas-purifying catalyst is degraded. When the average particle diameter is more than 20 micrometers, the $NO_x$ adsorbent exhibits reduced reactivity toward $NO_x$, and thereby the $NO_x$ purifying capability of the resulting exhaust-gas-purifying catalyst is decreased unfavorably.

The loading amount of the $NO_x$ adsorbent preferably falls in a range of from 0.05 to 3.0 moles, further preferably from 0.1 to 1.0 mole, with respect to 1 liter of a porous support.

Moreover, in the the present invention, the loading amount of platinum preferably falls in a range of from 0.1 to 20.0 grams, further preferably from 0.5 to 10.0 grams, with respect to 1 liter of a porous support. When the loading amount is less than 0.1 gram with respect to 1 liter of a porous support, the $NO_x$ purifying capability of the resulting exhaust-gas-purifying catalyst is degraded initially and after a durability test. When the loading amount is more than 20.0 grams with respect to 1 liter of a porous support, not only the catalytic effect of platinum is saturated, but also the excessively loaded platinum cannot be utilized effectively.

Likewise, the loading amount of palladium preferably falls in a range of from 0.1 to 20.0 grams, further preferably from 0.5 to 10.0 grams, with respect to 1 liter of a porous support.

The loading amount of rhodium preferably falls in a range of from 0.001 to 5.0 grams, further preferably from 0.05 to 0.5 grams, with respect to 1 liter of a porous support. When the loading amount is less than 0.001 gram with respect to 1 liter of a porous support, the $NO_x$ purifying capability of the resulting exhaust-gas-purifying catalyst is degraded initially and after a durability test. When the loading amount is more than 5.0 grams with respect to 1 liter of a porous support, not only the catalytic effect of rhodium is saturated, but also the excessively loaded rhodium cannot be utilized effectively.

It is furthermore preferred that rhodium be used together with platinum and/or palladium. Hence, it is preferred to relatively determine the loading amount of rhodium with respect to the loading amount of platinum and/or palladium. For example, the loading ratio of rhodium with respect to the loading amount of platinum and/or palladium is preferably 1/5 or less, further preferably 1/10 or less.

It is moreover preferred that at least one co-catalyst element selected from the group consisting of rare-earth elements, alkali metals, alkaline-earth metals and titanium-group elements is further loaded on a porous support. In the present invention, the term "rare-earth elements" means scandium (So), yttrium (Y), lanthanum (La), and chemical elements with atomic numbers 58 to 71. As for a rare-earth element working as the co-catalyst element, cerium can be further loaded on a porous support in the form of cerium oxide. The loading amount of cerium preferably falls in a range of from 0.05 to 2.0 moles, further preferably from 0.1 to 1.0 mole, with respect to 1 liter of a porous support. When the loading amount is less than 0.05 moles with respect to 1 liter of a porous support, the purifying performance of the resulting exhaust-gas-purifying catalyst is decreased in atmosphere adjacent to the stoichiometric point. When the loading amount is more than 2.0 moles with respect to 1 liter of a porous support, not only the co-catalytic effect of cerium is saturated, but also the surface area of the resulting porous support is reduced unfavorably.

The term "alkali metals" herein means elements of Group 1A in the periodic table of the elements. As for the alkali metals, it is possible to exemplify lithium (Li), sodium (Na), potassium (K), rubidium (Rb), cesium (Cs), and francium (Fr). The term "alkaline-earth metals" means elements of Group 2A in the periodic table of the elements. As for the alkaline-earth metals, it is possible to exemplify beryllium (Be), magnesium (Mg), calcium (Ca), strontium (Sr), barium (Ba) and radium (Ra). The term "titanium-group elements" herein means elements of Group 4B in the periodic table of the elements. As for the titanium-group elements, it is possible to exemplify titanium (Ti), zirconium (Zr), and hafnium (Hf). The loading amount of the co-catalyst element preferably falls in a range of from 0.02 to 1.0 mole, further preferably from 0.05 to 0.5 moles, with respect to 1 liter of a porous support. When the loading amount is less than 0.02 moles with respect to 1 liter of a porous support, the co-catalyst element little effects to stabilize platinum. When the loading amount is more than 1.0 mole with respect to 1 liter of a porous support, the co-catalyst element unfavorably inhibits the adsorbed $NO_x$ from decomposing. The loading amount of from 0.05 to 0.5 moles is especially preferred, because the NOx purifying performance of the resulting exhaust-gas-purifying catalyst is maximized.

As for a porous support, it is preferable to employ alumina. Note that, however, zirconia, or silica alumina can be employed as well. When utilizing alumina as a porous support, it is appropriate to solid-solve a rare-earth element in alumina in advance in order to prevent alumina and barium (i.e., the $NO_x$ adsorbent) from reacting with each other. In addition, not only a catalyst support per se can be formed of a porous support (e.g., alumina, zirconia, or silica alumina), but also a porous support can be coated on a honeycomb substance formed of cordierite, or heat-resistant metal.

In the present invention, an exhaust-gas-purifying catalyst can be prepared in the following manner; namely: a powder of an $NO_x$ adsorbent is mixed with a powder of a porous support in an aqueous solution, thereby preparing a dispersion slurry. Then, the resulting slurry is coated on a monolithic catalyst support formed of cordierite.

The loading order of the catalyst ingredients is not limited herein in particular. However, note that, when the noble metal catalyst ingredient (e.g., platinum, palladium, and rhodium) is loaded after loading the $NO_x$ adsorbent and the co-catalyst element (e.g., cerium), its catalytic capability can be utilized effectively.

Further, similarly to a powder of an $NO_x$ adsorbent, the co-catalyst element to be further loaded on a porous support and selected from the group consisting of rare-earth elements, alkali metals, alkaline-earth metals and titanium-group elements can be mixed with a powder of a porous support to load thereon, or it can be finally loaded thereon by using its solution.

Furthermore, the loading method of the catalyst ingredient is not limited herein in particular, and it can be carried out by similarly following conventional and general methods. For example, a porous support is immersed into an aqueous solution including a catalyst ingredient compound, and then it is dried and calcinated to load a catalyst ingredient.

Moreover, a compound of the rare-earth element (e.g., cerium oxide) can be further loaded on a porous support by involving it in a porous support, or by mixing it with a porous support. The rare-earth element (e.g., cerium) can effect to upgrade the initial dispersibility of noble metal catalyst ingredient (e.g., platinum). Hence, it is preferable to load the rare-earth element (e.g., cerium) prior to loading the noble metal catalyst ingredient. The rare-earth element (e.g., cerium) can be loaded on a porous support by mixing it with a porous support in an aqueous solution including the nitrate of the rare-earth element (e.g., cerium nitrate). It is believed that, when the rare-earth element (e.g., cerium oxide) is thus loaded on a porous support, the dispersibility of noble metal catalyst ingredient (e.g., platinum) is improved so as to prevent the granular growth of the noble metal catalyst ingredient and inhibit the purifying performance of the resulting exhaust-gas-purifying catalyst from deteriorating.

In addition, when at least one co-catalyst element selected from the group consisting of alkali metals, alkaline-earth metals and titanium-group, elements is further loaded on a porous support, the co-catalyst element effects to prevent the $NO_x$ adsorbent from producing its sulfites and sulfates (e.g., barium sulfite and barium sulfate) which do not exhibit the $NO_x$ adsorbing capability.

The exhaust-gas-purifying process according to the present invention can be carried out by ordinary methods. Specifically, in the present exhaust-gas-purifying process, it is not needed to specify the following parameters; namely: a space velocity (SV) for bringing exhaust gases into contact with a catalyst carrier layer of the present exhaust-gas-purifying catalyst, a temperature in the catalyst carrier layer, and the like.

In the exhaust-gas-purifying catalyst according to the present invention, the particulate $NO_x$ adsorbent having an average particle diameter of from 0.1 to 20 micrometers is loaded on the porous support along with the noble metal catalyst ingredient. Thus, when exhaust gases including $SO_2$ are brought into contact with the porous support in oxygen-rich (i.e., fuel-lean) atmosphere, the $NO_x$ adsorbing capability of the $NO_x$ adsorbent is not decreased because sulfates and sulfites are inhibited from adsorbing on the $NO_x$ adsorbent. As a result, even in oxygen-rich atmosphere, $NO_x$ included in exhaust gases can be adsorbed on the $NO_x$ adsorbent so that the present exhaust-gas-purifying catalyst can keep its purifying performance.

In fuel-lean (i.e., oxygen-rich) atmosphere, the $NO_x$ is adsorbed on the $NO_x$ adsorbent. Then, in stoichiometric atmosphere or fuel-rich (i.e., oxygen-lean) atmosphere, the adsorbed $NO_x$ is spilt over reversely. Thus, $NO_x$ is transferred to the noble metal catalyst ingredient (e.g., platinum or palladium), and it is reacted with CO and HC included in exhaust gases, and thereby it is reduced and purified to $N_2$. At the same time, CO and HC are oxidized and purified.

A series of the above-described mechanisms enable to holding the $NO_x$ adsorbing capability for a long period of time, and thereby the present exhaust-gas-purifying catalyst can exhibit its highly active purifying performance for a long time. Thus, by using the present-exhaust-gas-purifying catalyst, it is possible to purify the harmful substances, $NO_x$ in particular, which are included in exhaust gases emitted from internal combustion engines, invariably for a long period of time.

As described so far, in accordance with the present invention, the $NO_x$ adsorbent is formed as a powder which has a specific average particle diameter, and it is loaded on the present exhaust-gas-purifying catalyst. As a result, even if $SO_2$ is present in exhaust gases of oxygen-rich (i.e., fuel-lean) atmosphere, the present exhaust-gas-purifying catalyst can exhibit satisfactory $NO_x$ purifying performance even after it is subjected to a durability test. Moreover, it can stably and efficiently purify $NO_x$ even in driving on the fuel-lean (i.e., oxygen-rich) side.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims. Unless otherwise specified, the term "parts" hereinafter means parts by weight.

(Preparation of Catalyst)

100 parts of an active alumina powder, 33 parts of a cerium oxide powder, 3 parts of a pseudo-boehmite powder, 65 parts of an aluminum nitrate aqueous solution having a concentration of 40% by weight, 200 parts of water, and a barium carbonate powder were mixed, thereby preparing a slurry for coating. Note that the barium carbonate powder was employed as the $NO_x$ adsorbent, its average particle diameter was changed variously, and it was prepared in predetermined parts to be loaded on a monolithic support as specified in Table 2 below.

Then, a plurality of honeycomb-shaped monolithic supports formed of cordierite were immersed into the slurry, and thereafter each of them was blown to blow away the slurry in excess. The supports had a diameter of 30 mm and a length of 50 mm. Thereafter, each of the supports was dried, and each of them was calcinated at 600° C. for 1 hour, thereby preparing a monolithic support having a coating layer thereon. The coating layer included cerium oxide and barium carbonate loaded therein, and it was coated on the monolithic support so that it included alumina in an amount of 120 grams with respect to 1 liter of the monolithic support.

With respect to Example No. 1 recited in Table 2, each of the monolithic supports having the coating layer thereon was immersed into a platinum dinitrodiammine aqueous solution having a predetermined concentration, and thereafter it was taken out of the solution and blown to blow away the water droplets in excess. After the blowing, each of the supports was dried at 250° C., thereby loading platinum thereon.

With respect to Example No. 2 recited in Table 2, each of the Pt-loaded monolithic supports was further immersed into a rhodium nitrate aqueous solution having a predetermined concentration, and thereafter it was taken out of the solution and blown to blow away the water droplets in excess. After the blowing, each of the supports was dried at 250° C., thereby loading rhodium thereon. The loading amounts of platinum and rhodium are set forth in Table 2.

With respect to Example No. 3, palladium was loaded as the noble metal catalyst ingredient to substitute for the platinum of Example No. 1.

With respect to Example No. 4, palladium and rhodium were loaded as the noble metal catalyst ingredients to substitute for the platinum and rhodium of Example No. 2.

With respect to Example Nos. 5 through 9, the average particle diameter of the barium carbonate used in Example No. 2 was changed in a range of from 0.2 to 20 micrometers.

With respect to Example No. 10, the average particle diameter of the barium carbonate used in Example No. 2 was changed to 1.0 micrometer, and lanthanum (i.e., a rare-earth element), zirconium (a titanium-group element), and lithium (i.e., an alkali metal) were further loaded on Example No. 2.

With respect to Example No. 11, the average particle diameter of the barium carbonate used in Example No. 2 was changed to 1.0 micrometer, and lanthanum (i.e., a rare-earth element), zirconium (a titanium-group element), potassium (i.e., an alkali metal) were further loaded on Example No. 2.

With respect to Example No. 12, the average particle diameter of the barium carbonate used in Example No. 2 was changed to 1.0 micrometer, and lanthanum (i.e., a rare-earth element), zirconium (a titanium-group element), and magnesium (i.e., an alkaline-earth metal) were further loaded on Example No. 2.

With respect to Example No. 13, the average particle diameter of the barium carbonate used in Example No. 4 was changed to 1.0 micrometer, and lanthanum (i.e., a rare-earth element), zirconium (a titanium-group element), lithium (i.e., an alkali metal) were further loaded on Example No. 4.

With respect to Example No. 14, an active alumina powder, a cerium oxide powder, a barium nitrate powder, and isopropyl alcohol were mixed, thereby preparing a slurry for coating. Note that Ce and Ba (i.e., $NO_x$ adsorbent) were mixed in prescribed parts to be loaded on a monolithic support as specified in Table 2.

Then, in the same manner as aforementioned, a coating layer was formed on a plurality of the identical honeycomb-shaped monolithic supports. Likewise, each of the the monolithic supports having the coating layer thereon was immersed into a platinum dinitrodiammine aqueous solution and a rhodium nitrate aqueous solution, thereby loading platinum and rhodium thereon.

TABLE 1

|  | A/F Ratio | NO | CO | $C_3H_6$ | $O_2$ | $H_2$ | $SO_2$ | $H_2O$ | $N_2$ |
| --- | --- | --- | --- | --- | --- | --- | --- | --- | --- |
| For Degrading | 18 | — | 0.1 | 0.06 | 4 | — | 0.05 | 6 | balance |
| " | 22 | — | 0.1 | 0.12 | 6 | — | 0.05 | 6 | balance |
| " | 14.5 | — | 0.6 | 0.04 | 0.3 | 0.2 | 0.05 | 6 | balance |
| For Evaluating | 22 | 0.05 | 0.1 | 0.12 | 6 | — | 2 ppm | 6 | balance |
| " | 14.5 | 0.12 | 0.6 | 0.04 | 0.3 | 0.2 | 2 ppm | 6 | balance |

(Note) Unless otherwise specified, the unit is % by volume.

TABLE 2

| Identification | Noble Metal Catalyst Ingredient Loading Amount (gram/liter) | | | NOx Adsorbent Loading Amount (mole/liter) | NOx Adsorbent Ave. Particle Dia. | Co-catalyst Element Loading Amount (mole/liter) | | | | | | Conversions after Durability Test (%) | | |
|---|---|---|---|---|---|---|---|---|---|---|---|---|---|---|
| | Pt | Pd | Rh | Ba | (micrometer) | Ce | La | Zr | Li | K | Mg | NOx | CO | HC |
| Ex. No. 1 | 2 | — | — | 0.3 | 1.5 | 0.3 | — | — | — | — | — | 48 | 96 | 89 |
| Ex. No. 2 | 2 | — | 0.1 | 0.3 | 1.5 | 0.3 | — | — | — | — | — | 52 | 98 | 90 |
| Ex. No. 3 | — | 10 | — | 0.3 | 1.5 | 0.3 | — | — | — | — | — | 50 | 95 | 89 |
| Ex. No. 4 | — | 10 | 0.2 | 0.3 | 1.5 | 0.3 | — | — | — | — | — | 53 | 97 | 90 |
| Ex. No. 5 | 2 | — | 0.1 | 0.3 | 0.2 | 0.3 | — | — | — | — | — | 49 | 98 | 87 |
| Ex. No. 6 | 2 | — | 0.1 | 0.3 | 1.0 | 0.3 | — | — | — | — | — | 51 | 98 | 90 |
| Ex. No. 7 | 2 | — | 0.1 | 0.3 | 5.0 | 0.3 | — | — | — | — | — | 50 | 98 | 88 |
| Ex. No. 8 | 2 | — | 0.1 | 0.3 | 10.0 | 0.3 | — | — | — | — | — | 49 | 99 | 89 |
| Ex. No. 9 | 2 | — | 0.1 | 0.3 | 20.0 | 0.3 | — | — | — | — | — | 47 | 98 | 89 |
| Ex. No. 10 | 2 | — | 0.1 | 0.3 | 1.0 | 0.3 | 0.2 | 0.05 | 0.1 | — | — | 55 | 98 | 92 |
| Ex. No. 11 | 2 | — | 0.1 | 0.3 | 1.0 | 0.3 | 0.2 | 0.05 | — | 0.1 | — | 54 | 98 | 90 |
| Ex. No. 12 | 2 | — | 0.1 | 0.3 | 1.0 | 0.3 | 0.2 | 0.05 | — | — | 0.1 | 53 | 98 | 94 |
| Ex. No. 13 | — | 10 | 0.2 | 0.3 | 1.0 | 0.3 | 0.2 | 0.05 | 0.1 | — | — | 54 | 98 | 92 |
| Ex. No. 14 | 2 | — | 0.1 | 0.3 | 1.5 | 0.3 | — | — | — | — | — | 51 | 97 | 90 |
| Comparative Ex. No. 21 | 2 | — | 0.1 | 0.3 | 0.05 | 0.3 | — | — | — | — | — | 43 | 96 | 86 |
| Comparative Ex. No. 22 | 2 | — | 0.1 | 0.3 | 30.0 | 0.3 | — | — | — | — | — | 41 | 97 | 88 |
| Comparative Ex. No. 23 | 2 | — | 0.1 | 0.3 | — | 0.3 | — | — | — | — | — | 38 | 96 | 88 |
| Comparative Ex. No. 24 | 2 | — | — | 0.3 | — | 0.3 | — | — | — | — | — | 36 | 95 | 88 |
| Comparative Ex. No. 25 | — | 10 | — | 0.3 | — | 0.3 | — | — | — | — | — | 35 | 95 | 85 |

(Comparative Examples)

Except that the loading amounts of the component metallic elements were set as recited in Table 2, and that the average particle diameter of the $NO_x$ adsorbent was varied as recited therein, Comparative Example Nos. 21 and 22 were prepared in the same manner as set forth in Example Nos. 1 through 14.

Except that the loading amounts of the component metallic elements were set as recited in Table 2, and that the barium was loaded by using a barium nitrate aqueous solution, Comparative Example Nos. 23 through 25 were prepared in the same manner as set forth in Example Nos. 1 through 14.

Examination and Evaluation

Each of the thus prepared exhaust-gas-purifying catalysts was subjected to a performance evaluation test by using model gases. As for the model gases, 3 model gases were prepared for a durability test whose compositions are summarized in Table 1 below, and 2 model gases were prepared for a performance evaluation test whose compositions are also summarized in Table 1. Specifically, each of the catalysts was degraded at 800° C. for 5 hours by a first durability-test model gas which had an air-fuel (A/F) ratio of 18. Thereafter, each of them was further degraded at 500° C. for 4 minutes alternately by a second durability-test model gas and a third durability-test model gas which had an A/F ratio of 22 and 14.5, respectively. This alternate degradation was carried out for a total of 10 hours with a recess of 1 minute after every 4 minutes. Note that the flow of the model gases was set at 1 liter/minute. Thus, each of the catalysts was forcibly exposed to $SO_2$ by this durability test.

After the durability test is over, each of the catalysts was examined for its average $NO_x$, CO and HC conversions; namely: each of them was alternately subjected to the two performance-evaluation-test model gases at 350° C. for 2 minutes. The two performance-evaluation-test model gases had an A/F ratio of 22 and 14.5, respectively. Specifically, each of them was alternately subjected to the two model gases at 350° C. for 2 minutes in a total of 5 cycles, and it was examined for its average $NO_x$, CO and HC conversions when it was subjected to the flow of the performance-evaluation-test model gas having an A/F of 22. The results of this performance evaluation test are set forth in Table 2.

As can be appreciated from Table 2, when the exhaust-gas-purifying catalysts had the $NO_x$ adsorbent whose average particle diameter fell in a range of from 0.1 to 20 micrometers (e.g., Example Nos. 1 through 13), they were improved over Comparative Example Nos. 21 through 25 in terms of the $NO_x$ conversion after the durability test.

In particular, when the exhaust-gas-purifying catalysts had the $NO_x$ adsorbent whose average particle diameter fell outside the claimed range (e.g., Comparative Example Nos. 21 and 22), they exhibited a lower $NO_x$ conversion after the durability test than the preferred embodiments of the present invention (e.g., Example Nos. 1 through 13).

Further, when Ba (i.e., $NO_x$ adsorbent) was loaded on the monolithic support by using a barium nitrate aqueous solution (e.g.,.. Comparative Example Nos. 23 through 25), the resulting exhaust-gas-purifying catalysts exhibited a much worse $NO_x$ conversion after the durability test than Comparative Example Nos. 21 and 22.

Hence, it was verified that, when Ba (i.e., $NO_x$ adsorbent) was loaded on the monolithic support in a particulate form and when it had an average particle diameter of from 0.1 to 20 micrometers, the $NO_x$ conversion of the resulting exhaust-gas-purifying catalyst was upgraded even after the durability test.

In addition, when at least one co-catalyst element selected from the group consisting of rare-earth elements, alkali metals, alkaline-earth metals, rare-earth elements and titanium-group elements was further loaded on the monolithic support (e.g. Example Nos. 10 through 13), the $NO_x$, CO and HC conversions of the resulting exhaust-gas-purifying catalysts were furthermore enhanced even after the durability test.

Having now fully described the present invention, it will be apparent to one of ordinary skill in the art that many changes and modifications can be made thereto without departing from the spirit or scope of the present invention as set forth herein including the appended claims.

What is claimed is:

1. A process for purifying an exhaust gas emitted from a lean-burn engine and including sulfur oxides, carbon monoxide, hydrocarbons and nitrogen oxides, the process comprising:

bringing the exhaust gas into contact with a catalyst:

the catalyst comprising:

a porous support;

at least one noble metal catalyst ingredient loaded on said porous support, and selected from the group consisting of platinum, palladium and rhodium;

at least one first co-catalyst ingredient selected from the group consisting of cerium and lanthanum;

at least one second co-catalyst ingredient selected from the group consisting of lithium, potassium, magnesium and zirconium; and barium working as an $NO_x$ adsorbent, and loaded on said porous support, said $NO_x$ adsorbent having an average particle diameter falling in a range of from 0.1 to 20 micrometers;

wherein (1) under a lean-burn atmosphere in which an oxygen concentration is above a neutral point that is required for oxidizing components to be oxidized in said exhaust gas, said nitrogen oxides in said exhaust gas are adsorbed by said $NO_x$ adsorbent;

(2) said exhaust gas is periodically adjusted from said lean-burn atmosphere to a fuel-rich atmosphere, thereby providing a reducing atmosphere in which said oxygen concentration is not greater than said neutral point; and (3) under said reducing atmosphere, said nitrogen oxides having been adsorbed by said $NO_x$ adsorbent are chemically reduced by a reaction with said hydrocarbons and said carbon monoxide in said exhaust gas.

2. The process according to claim 1, wherein said $NO_x$ adsorbent is at least one powder selected from the group consisting of barium carbonate, barium oxalate and barium oleate.

3. The process according to claim 1, wherein said $NO_x$ adsorbent is at least one powder selected from the group consisting of barium acetate, barium formate, barium citrate, barium oxide, barium nitrite, barium nitrate, barium hydroxide and barium tartrate.

4. The process according to claim 1, wherein said average particle diameter is from 0.5 to 10 micrometers.

5. The process according to claim 1, wherein said $NO_x$ adsorbent is loaded on said porous support in an amount of from 0.05 to 3.0 moles with respect to 1 liter of said porous support.

6. The process according to claim 1, wherein said noble metal catalyst ingredient is at least one of platinum and palladium, and is loaded on said porous support in an amount of from 0.1 to 20.0 grams with respect to 1 liter of said porous support.

7. The process according to claim 1, wherein said noble metal catalyst ingredient is rhodium, and is loaded on said porous support in an amount of from 0.001 to 5.0 grams with respect to 1 liter of said porous support.

8. The process according to claim 1, wherein said noble metal catalyst ingredient is rhodium and at least one of platinum and palladium, said rhodium is loaded on said porous support in an amount of from 0.001 to 5.0 grams with respect to 1 liter of said porous support, and a loading ratio of said rhodium with respect to said at least one of platinum and palladium is 1/5 or less.

9. The process according to claim 1, wherein said porous support is formed of at least one substance selected from the group consisting of alumina, zirconia and silica alumina.

10. The catalyst according to claim 1, wherein said $NO_x$ adsorbent is loaded prior to said noble metal catalyst ingredient.

11. The process according to claim 1, wherein said first co-catalyst ingredient is loaded on said porous support in an amount of from 0.05 to 2.0 moles with respect to 1 liter of said porous support.

12. The process according to claim 1, wherein said second co-catalyst ingredient is loaded on said porous support in an amount of from 0.02 to 1.0 mole with respect to 1 liter of said porous support.

* * * * *